United States Patent
Weinhold et al.

(10) Patent No.: US 10,904,197 B2
(45) Date of Patent: Jan. 26, 2021

(54) MANAGEMENT OF MEMBERS OF SOCIAL NETWORK CONVERSATIONS

(71) Applicant: salesforce.com, inc., San Francisco, CA (US)

(72) Inventors: Rebecca Elizabeth Weinhold, Seattle, WA (US); Emily Behrendt, Seattle, WA (US); Caroline Joan Liu, Vancouver (CA); Zara Chiara Jumamil Fernandez, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 180 days.

(21) Appl. No.: 15/847,766

(22) Filed: Dec. 19, 2017

(65) Prior Publication Data
US 2019/0190876 A1   Jun. 20, 2019

(51) Int. Cl.
*H04L 12/58* (2006.01)
*G06Q 50/00* (2012.01)
*G06F 3/0482* (2013.01)
*G06F 16/25* (2019.01)

(52) U.S. Cl.
CPC ............ *H04L 51/32* (2013.01); *G06F 3/0482* (2013.01); *G06F 16/252* (2019.01); *G06Q 50/01* (2013.01); *H04L 51/12* (2013.01); *H04L 51/22* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Tonia L Dollinger
*Assistant Examiner* — Ishrat Rashid
(74) *Attorney, Agent, or Firm* — Weaver Austin Villeneuve & Sampson LLP

(57) ABSTRACT

Disclosed are some implementations of systems, apparatus, methods and computer program products for managing members of online social network conversations. A user can access a list of members of an online social network conversation by interacting with a user interface element of a graphical user interface (GUI). The list of members can be modified directly via interaction with the list.

20 Claims, 12 Drawing Sheets

(56) References Cited

U.S. PATENT DOCUMENTS

| | | |
|---|---|---|
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0162651 A1* | 7/2008 | Madnani ............... G06Q 10/107 709/206 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |

(56) References Cited

U.S. PATENT DOCUMENTS

| | | |
|---|---|---|
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2012/0331397 A1* | 12/2012 | Eidelson ............. G06Q 10/107 715/751 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0006525 A1* | 1/2014 | Freund ................... H04L 51/16 709/206 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0026597 A1* | 1/2015 | Gadamsetty .......... H04L 51/046 715/753 |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

* cited by examiner

MANAGEMENT OF MEMBERS OF SOCIAL NETWORK CONVERSATIONS

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to database systems and techniques associated with social networking systems. More specifically, this patent document discloses techniques for using and maintaining data objects in a database system to manage members of social media conversations.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Users today can communicate with one another using a variety of communication platforms and social networking systems. Through these channels, a user may compose a message and share the message with selected individuals or groups.

BRIEF DESCRIPTION OF THE DRAWINGS

The included drawings are for illustrative purposes and serve only to provide examples of possible structures and operations for the disclosed systems, apparatus, methods and computer program products for leveraging and managing assessment environments in an assessment hub. These drawings in no way limit any changes in form and detail that may be made by one skilled in the art without departing from the spirit and scope of the disclosed implementations.

FIG. 2C shows a GUI 230 generated on a display device of a client machine in a social network environment, in accordance with one or more implementations.

FIG. 2D shows a GUI 280 generated on a display device of a client machine in a social network environment, in accordance with one or more implementations.

FIG. 2E shows a GUI 284 generated on a display device of a client machine in a social network environment, in accordance with one or more implementations.

DETAILED DESCRIPTION

Figure 1:
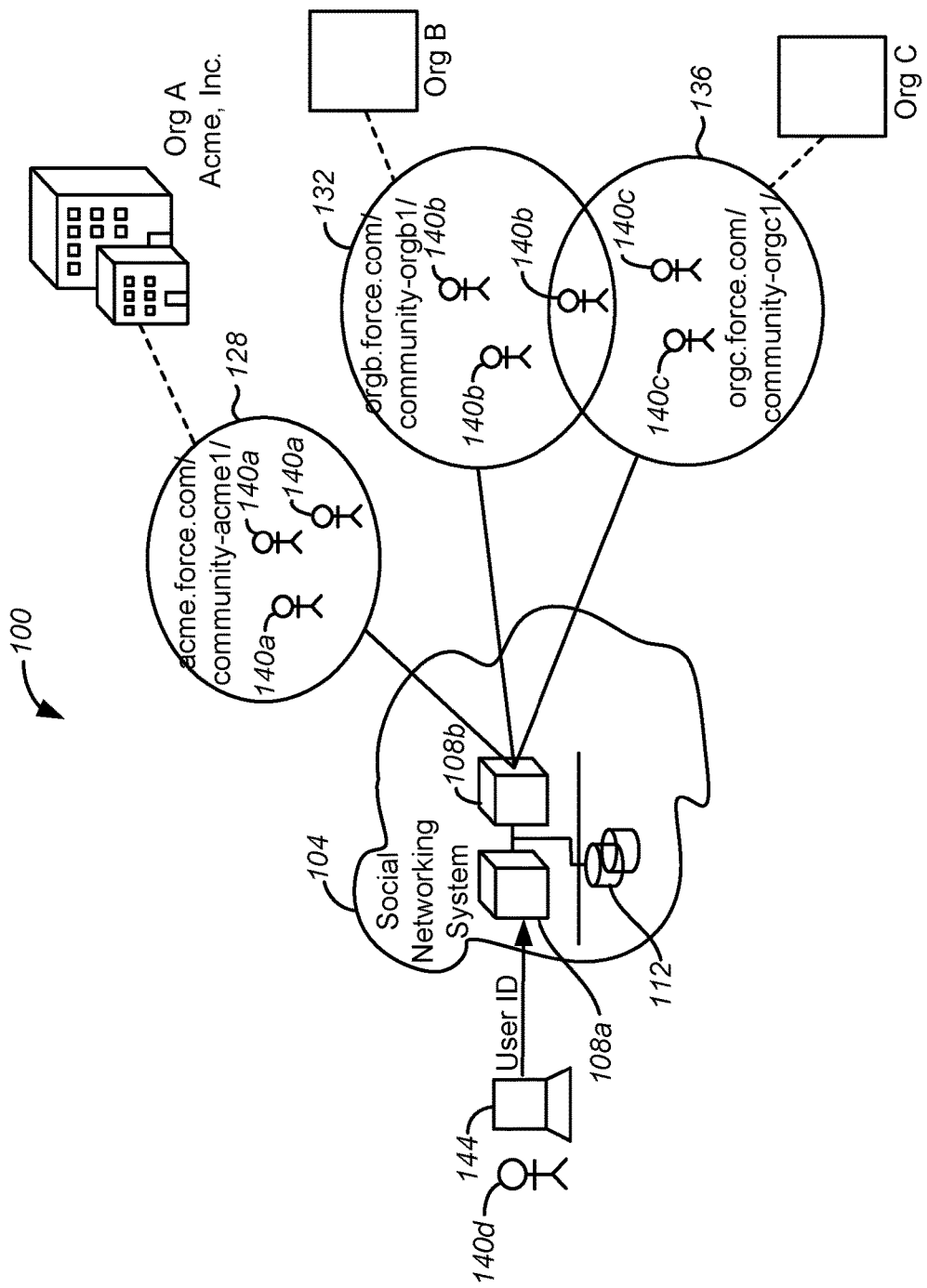
FIG. 1 shows a system diagram of an example of a database system 100 in a social networking environment, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Online social networks are increasingly becoming a common way to facilitate communication among people who can be recognized as users of a social networking system. Some online social networks can be implemented in various settings, including organizations, e.g., enterprises such as companies or business partnerships, academic institutions, or groups within such an organization. For instance, Chatter® can be used by employee users in a division of a business organization to share data, communicate, and collaborate with each other for various purposes.

Various implementations described or referenced herein are directed to different systems, apparatus, methods and computer-readable storage media for managing members of conversations conducted on an online social network, also referred to herein as a social networking system. One example of an online social network is Chatter®, provided by salesforce.com, inc. of San Francisco, Calif. salesforce.com, inc. is a provider of social networking services, customer relationship management (CRM) services and other database management services. These various services can be provided in a cloud computing environment, for example, in the context of a multi-tenant database system. Different communities of users can be created and managed in such an environment without having to install software locally, that is, on computing devices of users accessing the communities. While the disclosed implementations are often described with reference to Chatter®, those skilled in the art should understand that the disclosed systems, apparatus, methods and computer-readable storage media can be implemented in the context of one or more other social networking systems, such as Facebook®, LinkedIn®, Twitter®, Google+®, Yammer® and Jive®.

A user of an online social network may share (e.g., post) a message with another individual, group, or community of individuals to initiate a conversation. For example, a user of Chatter® may share a message with an individual or group of individuals by "mentioning" the individual or group using @individual or @group. The user who initiated the conversation may be referred to as the "author" of the message, while the individual, group, or community with whom the message is shared may be referred to as the recipient of the message. Therefore, the members of the conversation initially include the author and the recipient(s) of the message.

A member of the conversation may also add new members other than the recipient to the conversation. For example, a member of the conversation may copy (e.g., cc) an individual or group of individuals on either the original message or a comment on the message. As another example, a member of the conversation may add a new member to the conversation by mentioning an individual or group of individuals, either with or without an accompanying comment.

As new members are added to the conversation and members comment on the original message, the feeds of members of the conversation can become extremely lengthy. Moreover, mentions of new members that do not include accompanying text can add to the length of the conversation without substantively adding to the conversation, resulting in unnecessary clutter in the feeds of the members. For these reasons, it can be difficult for a member of a conversation to ascertain who is participating in the conversation. This can result in frustration and wasted time spent reading through feeds to determine who has been added to the conversation.

Some implementations of the disclosed systems, apparatus, methods and computer program products are configured for managing members of an online social network conversation. This may be accomplished, in part, through the generation of a conversation membership list that can be accessed by conversation members. By enabling a conversation member to access the list via a graphical user interface (GUI), the member can easily ascertain those individuals, groups, or communities that will receive a message or comment that the member chooses to share with other members of the conversation.

By way of illustration, John is an engineer within an organization, Simple Software Solutions, Inc. John is working on a project with other individuals within his team. John decides to initiate a conversation by sharing a message with another individual within his team, Emily, regarding the project. Emily then mentions individuals Tim and Carol in relation to the conversation. Emily and Tim each choose to comment on the message. Later, Tim mentions Jeff and Michelle in relation to the conversation.

Several days later, Emily has a new idea to share with John and returns to the conversation. Since her feed has become quite lengthy since John's initial message, Emily is having difficulty ascertaining who is a member of the conversation. Emily accesses a conversation membership interface using her desktop computer to view a list of the members of the conversation. Emily then submits a comment and mentions George to add him to the conversation.

George accesses the list of the members of the conversation via a conversation membership interface using his laptop. Since he is not interested in this conversation, he removes himself from the conversation by interacting with the conversation membership interface.

In some online social networks, users can access one or more information feeds, which include information updates presented as items or entries in the feed. Such a feed item can include a single information update or a collection of individual information updates. A feed item can include various types of data including character-based data, audio data, image data and/or video data. An information feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, an online social network may allow a user to follow data objects in the form of records such as cases, accounts, or opportunities, in addition to following individual users and groups of users. The "following" of a record stored in a database allows a user to track the progress of that record. Updates to the record, also referred to herein as changes to the record, are one type of information update that can occur and be noted on an information feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be user-submitted messages or can otherwise be generated in response to user actions or in response to events. Examples of messages include: posts, comments, indications of a user's personal preferences such as "likes" and "dislikes", updates to a user's status, uploaded files, and hyperlinks to social network data or other network data such as various documents and/or web pages on the Internet. Posts can include alphanumeric or other character-based user inputs such as words, phrases, statements, questions, emotional expressions, and/or symbols. Comments generally refer to responses to posts, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed, also referred to herein as the user's "wall," which is one example of an information feed displayed on the user's profile page.

In some implementations, an information feed may be specific to a group of users of an online social network. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to an information feed for a particular user, group, object, or other construct within an online social network, an email notification or other type of network communication may be transmitted to all users following the user, group, or object in addition to the inclusion of the data as a feed item in one or more feeds, such as a user's profile feed, a news feed, or a record feed. In some online social networks, the occurrence of such a notification is limited to the first instance of a published input, which may form part of a larger conversation. For instance, a notification may be transmitted for an initial post, but not for comments on the post. In some other implementations, a separate notification is transmitted for each such information update.

Some implementations of the disclosed systems, apparatus, methods and computer-readable storage media are configured to provide communities of users in an online social network. Such communities are to be differentiated from "groups" of users in Chatter®, described in greater detail below. That is, a community of users can exist as an entity apart from and in addition to any group or groups of such users in the social network, although some of the rights and restrictions provided to a community member may be the same or similar as those provided to a member of a group. In some implementations, a community can be defined as a secure space for different stake-holders of an organization, such as employees, customers and partners of the organization, to collaborate with one another by accessing shared data, interacting with community-centric tasks and business processes, and using conversational services such as chat sessions, feed-based communication, and private messaging. The community can be structured and maintained as a public or private space for users having different relationships with the organization, so the users can converse and collaborate in an effective manner. The users can be of different types, such as internal or external, and/or the users can have different roles, such as employee, customer or partner, with such types and roles defining a user's relationship with the organization. For example, a partner can be an entity external to an organization that sells services and/or provides support on behalf of an employee, who is an internal user of the organization. Multiple communities can be implemented, some affiliated with different organizations, and a user can navigate across the communities in a seamless fashion from the user's perspective.

Each community can be structured so a community leader, system administrator or other user having appropriate security clearance can define rules governing community membership and privileges governing: i) access and use of various community data, ii) the ability to take action and cause events to occur in relation to the community, and iii) the visibility of users to each other. These various privileges can be defined and customized at a granular level, for instance, with different access rights and restrictions configured on a per-user or per-type of user basis, on a per-data item or per-type of data basis, and/or on a per-action or per-type of action basis.

In some instances, a user can have different user profiles for different communities. In other instances, a user can have a primary user profile and can select which fields of the profile are to be exposed to each community of which the user is a member. In some implementations, a user's community profile has a child-parent relationship with the primary profile and is tailored to inherit data from selected fields of the primary profile.

In some instances, a community can be open, as is often the case with public communities, in that there are no or minimal restrictions on users to access data, initiate actions, and view other community members' profiles, regardless of user type or role with respect to an organization. Thus, in a public community, employees, customers and partners of an organization affiliated with the community can freely view community data and each other's profiles, follow the same objects, and converse using the same feeds, by virtue of being members of the same community.

In some implementations, a user can gain access to a community by logging in to the social networking system hosting the community. In other implementations, the same user identity (ID), such as a login name or email address assigned to a given user, can be used by a user to directly log in and thus gain access to a community, that is, without requiring the user to separately log in to the social networking system hosting the community.

In some implementations, full collaboration in a community is possible regardless of user type or role. Internal and external users can be provided with full access or the same level of restricted access to the same feeds available through the community, and such users can view each other's walls and follow each other. The terms "information feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information such as a post submitted by a user, which can be presented in the feed. Feed items of information about a user can be presented in a user's profile feed of the database, while feed items of information about a record can be presented in a record feed in the database, by way of example. A profile feed and a record feed are examples of different information feeds. A second user following a first user and a record can receive the feed items associated with the first user and the record for display in the second user's news feed, which is another type of information feed. In some implementations, the feed items from any number of followed users and records can be combined into a single information feed of a particular user.

As examples, a feed item can be a message, such as a user-generated post of text data, or a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

In accordance with various implementations, a conversation member management interface enables users to access a list of members of an online social network conversation. The list is modifiable via interaction with the interface. Therefore, members of a conversation can easily ascertain the members of a conversation without scrolling through their feed.

In some implementations, user feeds are filtered to remove feed items that merely pertain to the addition of users to an online social network conversation. Therefore, the feeds of the members of a conversation may remain uncluttered by feed items that are not substantive.

Since feed items pertaining to a particular conversation may be transmitted to all individuals following a user, group, or object, feeds of these users may be impacted even if they are not members of a particular conversation. In some implementations, followers of a user, group, or object may be treated as members of a conversation for purposes of identifying individuals or groups who are receiving feed items (e.g., posts, comments, mentions) pertaining to the conversation within their feeds. More particularly, feeds of the followers may be filtered to remove posts that pertain solely to the addition of new members to the conversation. In addition, a conversation membership interface may identify all individuals and/or groups who receive posts pertaining to the conversation within their feeds. This larger list may be maintained and accessed independently from the above-described conversation members list that solely identifies members of the conversation.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

FIG. 1 shows a system diagram of an example of a database system 100 in a social networking environment, in accordance with some implementations. In FIG. 1, a social networking system 104 includes any number of computing devices such as servers 108a and 108b. The servers 108a and 108b are in communication with one or more storage mediums configured to store and maintain relevant data used to perform some of the techniques disclosed herein. In this example, the storage mediums include one or more databases 112, which may each include one or more tables that include data records. The databases 112 can maintain user profiles of users. Each profile can include information such as user ID, name, email address, phone number, and/or time zone. In some implementations, the databases 112 can maintain information that identifies members of respective groups, communities, or conversations. This information can include, for example, lists of IDs of users, groups, and/or communities that are members of a conversation. By way of example, a "Conversation 1 Membership" table in databases 112 can include a list of IDs of users who are members of Conversation 1, a "Conversation 2 Membership" table can include a list of IDs of users who are members of Conversation 2, and so forth.

In addition, in some implementations, the databases 112 are configured to store privilege information identifying or specifying access rights and restrictions of users according to various attributes such as a specified user ID, type of user, role of user, type of community to which the user belongs, and/or a particular organization on behalf of which a community is maintained.

In FIG. 1, the social networking system servers 108 can be configured to maintain one or more communities of users such as communities 128, 132 and 136 by interacting with databases 112 to identify members of those communities and privileges of members of a given community. Any number of users such as users 140a, 140b and 140c can be serviced by social networking system 104. That is, any such users 140 can have user IDs and other relevant data such as user profiles maintained in social networking system 104. By leveraging the information stored in storage mediums such as databases 112, communities 128, 132 and 136 of such users 140 can be defined. Thus, in this example, the community 128 includes users 140a, community 132 includes users 140b, and community 136 includes users 140c and one of users 140b. Thus, one of the users 140b is a member of both communities 132 and 136. When any such users 140 log in directly to a community, bypassing login pages of social networking system 104, or log in via social networking system 104 using a suitable computing device such as a laptop, tablet or smartphone, such users can be allowed to access data and take one or more actions available through social networking system 104 as permitted by the relevant privilege information.

In accordance with various implementations, a user may make a request via servers 108a and 108b to share a message by posting a message on a community feed of a community of which the user is a member. In some implementations, a user may post a message on walls of other users. In addition, a user may follow users in association with a particular community. Users that are members of a particular community may be automatically registered as followers of other users within the community. Therefore, messages shared with the community may appear in the feed of each user within the community.

In FIG. 1, each of the communities 128, 132 and 136 is operated on behalf of a different organization. In this example, community 128 is operated on behalf of Org A, which in this example is Acme, Inc. For example, the users 140a in community 128 may be employees, customers and/or partners of Acme, Inc. By the same token, the community 132 is operated on behalf of Org B, which can be any type of organization as described in greater detail below. The community 136 is maintained on behalf of Org C. The various users in a given community can have different relationships with the organization on behalf of which the community is maintained. Thus, one or more of the users 140b can be an employee, customer or business partner of Org B. In this example, as mentioned above, one of the users 140b is a member of both communities 132 and 136. Thus, this user 140b could be an employee of Org B and a customer of Org C by way of example. While the communities 128, 132 and 136 in this example are each operated on behalf of a different organization, communities may also be operated on behalf of the same organization.

In FIG. 1, each community 128, 132 and 136 often has one or more pages of relevant community data maintained by social networking system 104, where such pages are accessible by a web browser program operating on a user's computing device. Thus, any user having access to a given community as defined by data stored in the privileges information can load part or all of such pages for display on the user's computing device. In the example of FIG. 1, a community's page or pages is accessible at a web domain such as a URL including an org value identifying the specific organization on behalf of which the community is maintained. This org value can be a character such as a letter, number, symbol, or string of characters identifying the specific organization with which the community is affiliated. Thus, pages or other social network data available to users 140a in community 128 can be accessed at a URL such as acme.force.com/community-acme1/. In this example of a URL, the string "acme" of "acme.force.com" can provide the org value, which identifies Acme, Inc. by name. In some instances, the "acme" of "community-acme1" can provide the org value identifying Acme, Inc. Acme, Inc. can have other web pages available to the general public, for example, at the URL acme.com, which is a different root domain than the acme.force.com address at which community-specific pages are provided.

The page or pages maintained by the social networking system 104 for community 132 can be accessed at the URL orgb.force.com/community-orgb1/. As in the example of Acme, Inc., the "orgb" of "orgb.force.com" or the "orgb" of "community-orgb1" can be the org value identifying Org B. One or more pages maintained on behalf of community 136 can similarly be accessed and identified with org values at the URL orgc.force.com/communityorgc1/.

When a user 140d directly logs in to a community using an appropriate login page at the community URL, and the user is identified as a member of a particular community, the web browser program on the user's computing device can be automatically routed to access a page at the URL specific to that user's community, such as acme.force.com/community-acme1/. For example, the page can include an information feed that includes messages shared by a member of that community via the social networking system. The user can choose to navigate through additional pages accessible via the community or communities to which the user belongs.

In accordance with various implementations, the servers 108 are configured to maintain information that identifies members of conversations conducted via the social networking system. Members of a given conversation may access a list of members of the conversation via a graphical user interface, as will be described in further detail below.

Figure 2A:
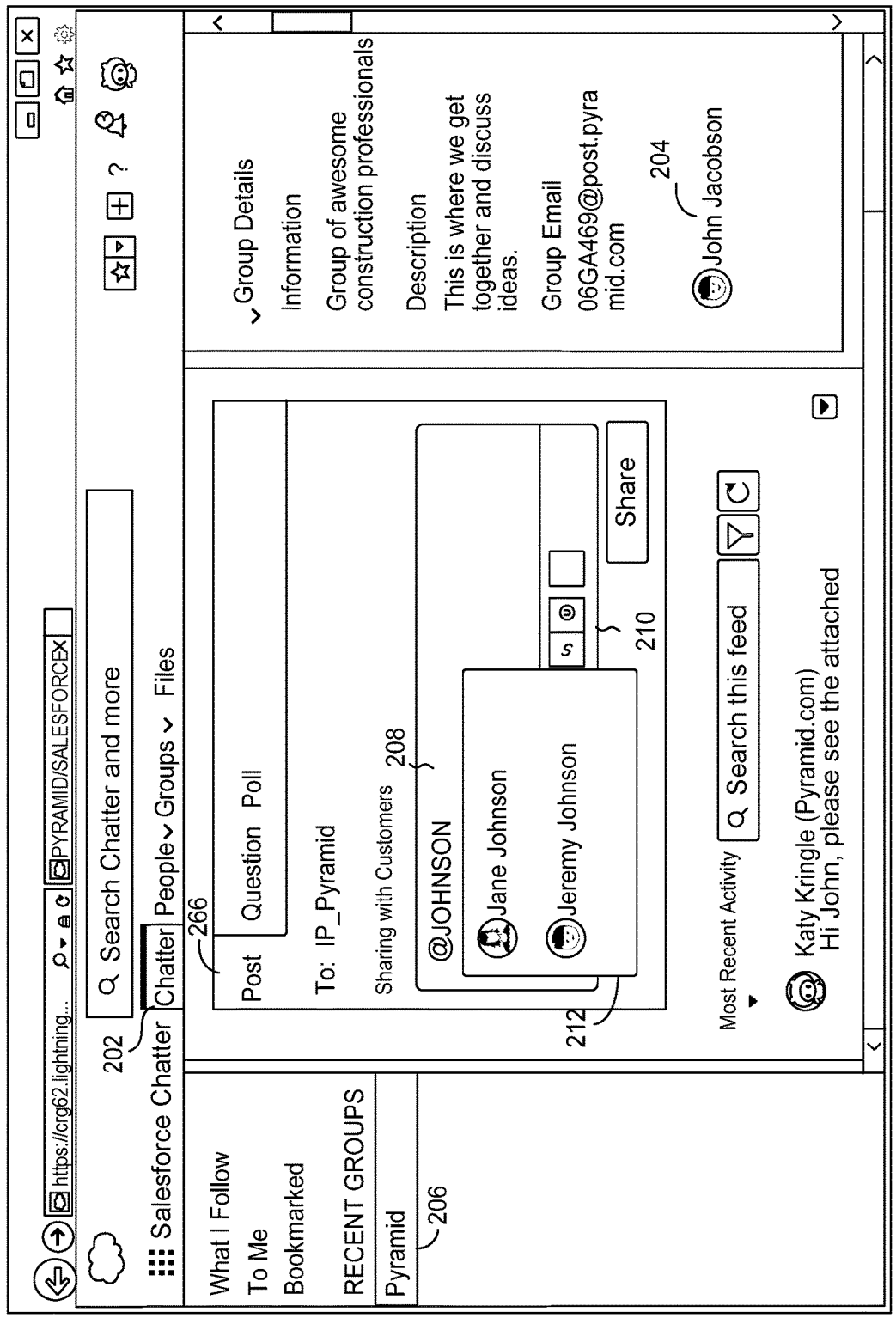
FIG. 2A shows a graphical user interface (GUI) 200 generated on a display device of a client machine in a social network environment, in accordance with one or more implementations.

FIG. 2A shows a graphical user interface (GUI) 200 generated on a display device of a client machine in a social network environment, in accordance with one or more implementations. In this example, social network system Chatter® 202 can be used by users within a group or community to share data, communicate, and collaborate with each other for various purposes. In this example, user John Jacobson 204 is a Sales employee within an organization, Pyramid Construction, Inc. As shown in this example, John is a member of the group, Pyramid 206. John identified a bug in the software that was recently updated and decides to share a social media message with the head of the Information Technology (IT) group, Jane Johnson, to request assistance. The social media message can be composed by the user prior to or after selection of recipients for the unshared social media message.

The social networking system obtains an indication of an intended recipient of an unshared social media message. For example, the indication of the intended recipient can include one or more letters of the recipient's first and/or last name. Where the intended recipient is a group of users, the indication can include one or more letters of the name of the group.

In this example, John types @Johnson as shown at 208 within user interface element 210. The system processes the indication of the intended recipient of the unshared social media message to identify one or more contacts. For example, the system may identify all possible contacts for which the identifier contains the letters "Johnson."

The system provides a user interface element 212 for display at a client device of the user. A user interface element can provide a suitable interface for presenting information to a user. In some implementations, a user interface element enables a user to submit input to the system and/or request information from the system. In this example, user interface element 212 is a pop-up window. However, it is important to note that a user interface element may be presented in another manner or format. For example, a user interface element may include a list, menu, window, panel, or other type of user interface.

User interface element 212 includes a contact identifier for each of the contacts. Each of the contacts is associated with a corresponding user profile stored in a database of the database system. As shown in this example, a list presents suggested contacts including Jane Johnson and Jeremy Johnson. Each of the contacts is user-selectable.

John hovers his mouse over the name "Jeremy Johnson" to select Jeremy Johnson Once a user has selected a contact, the user may post a media message to share the message with the selected contact(s).

Figure 2B:
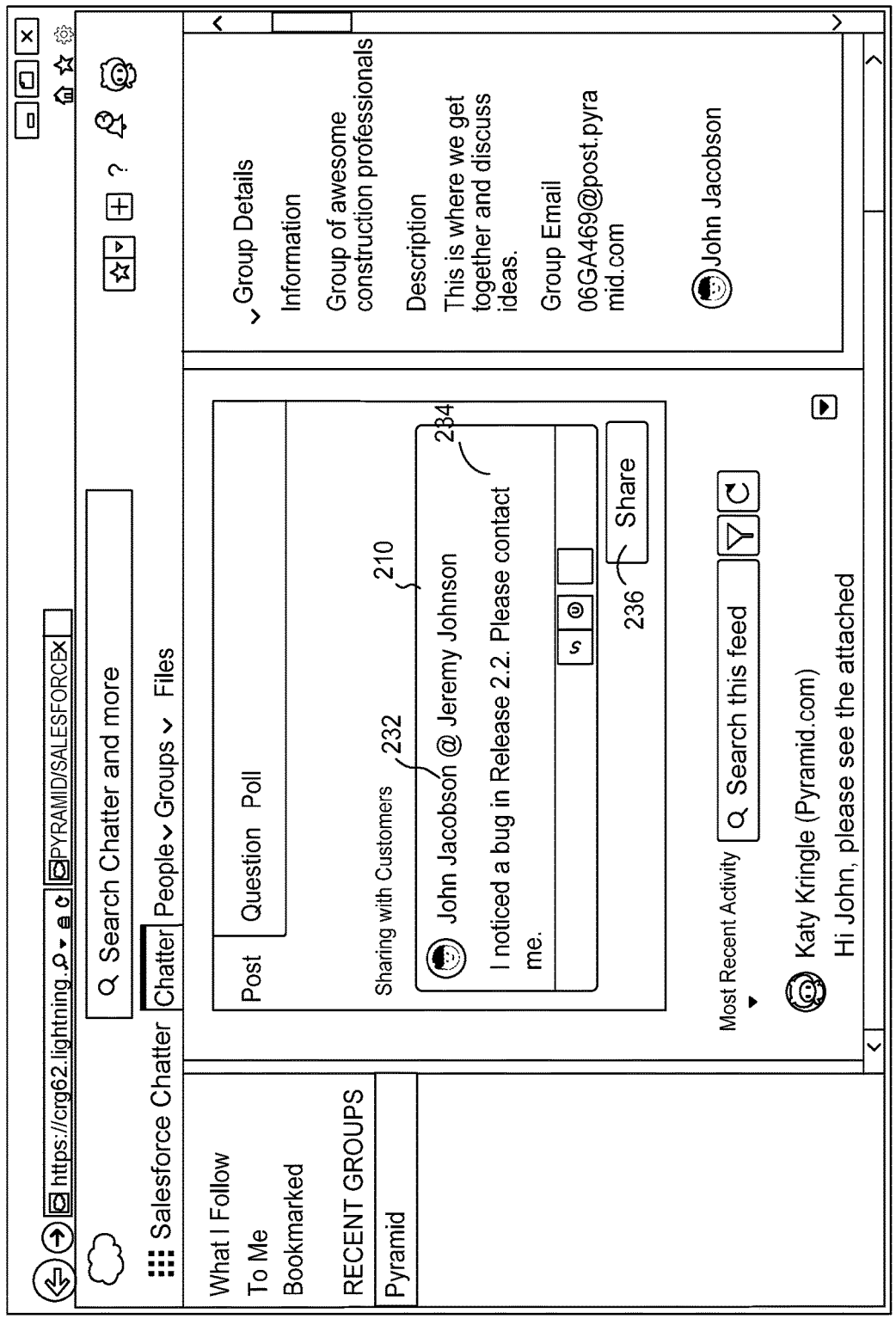
FIG. 2B shows a GUI 230 generated on a display device of a client machine in a social network environment, in accordance with one or more implementations.

FIG. 2B shows a GUI 230 generated on a display device of a client machine in a social network environment, in accordance with one or more implementations. John Jacobson 262 types a message 234 indicating the presence of a bug in the recent release. John then clicks on Share/Post user interface element 236 and message 234 is shared with Jeremy Johnson.

Figure 2C:
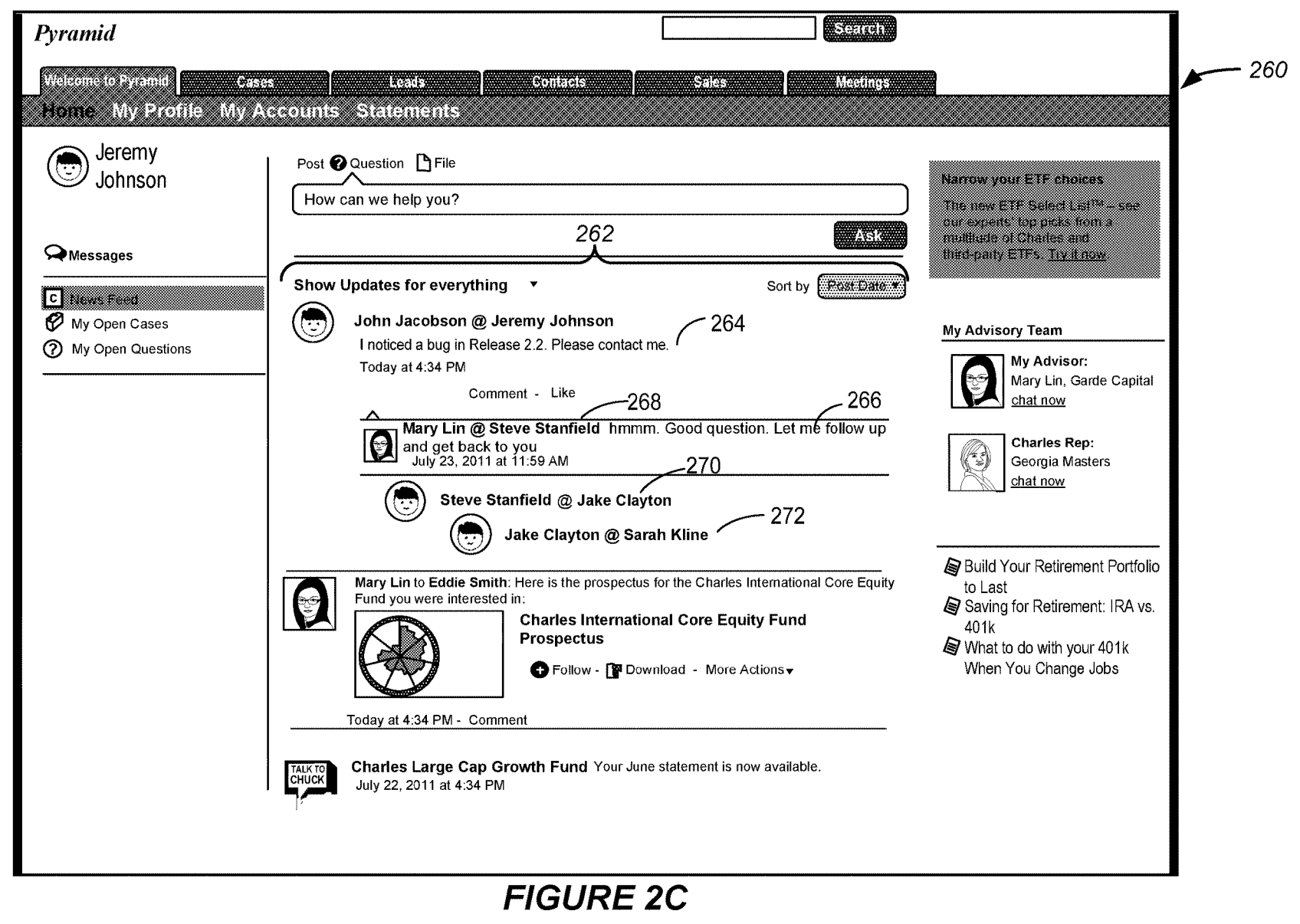

FIG. 2C shows a GUI 260 generated on a display device of a client machine in a social network environment, in accordance with one or more implementations. As shown in FIG. 2C, GUI 260 presents a feed 262 of Jeremy Johnson, which includes multiple feed items. The message that has been shared by John Jacobson will be included in the feed 262 of Jeremy Johnson, as shown at 264. In this example, co-worker Mary Lin submits a comment 266 on the message 264. In addition, Mary Lin mentions another co-worker, Steve Stanfield, in conjunction with the comment 266, as shown at 268. Since Steve Stanfield has been added as a member of the conversation, Steve Stanfield can add additional members to the conversation. As shown in this example, Steve Stanfield mentions Jake Clayton at 270 without submitting an associated comment. Since Jake Clayton is now a member of the conversation, he can also add additional members to the conversation. Jake Clayton then mentions Sarah Kline at 272 without submitting an associated comment. As members are added via further mentions, the feed becomes more lengthy and it becomes more difficult for a user to ascertain the identities of all of the members of the conversation.

Figure 2D:
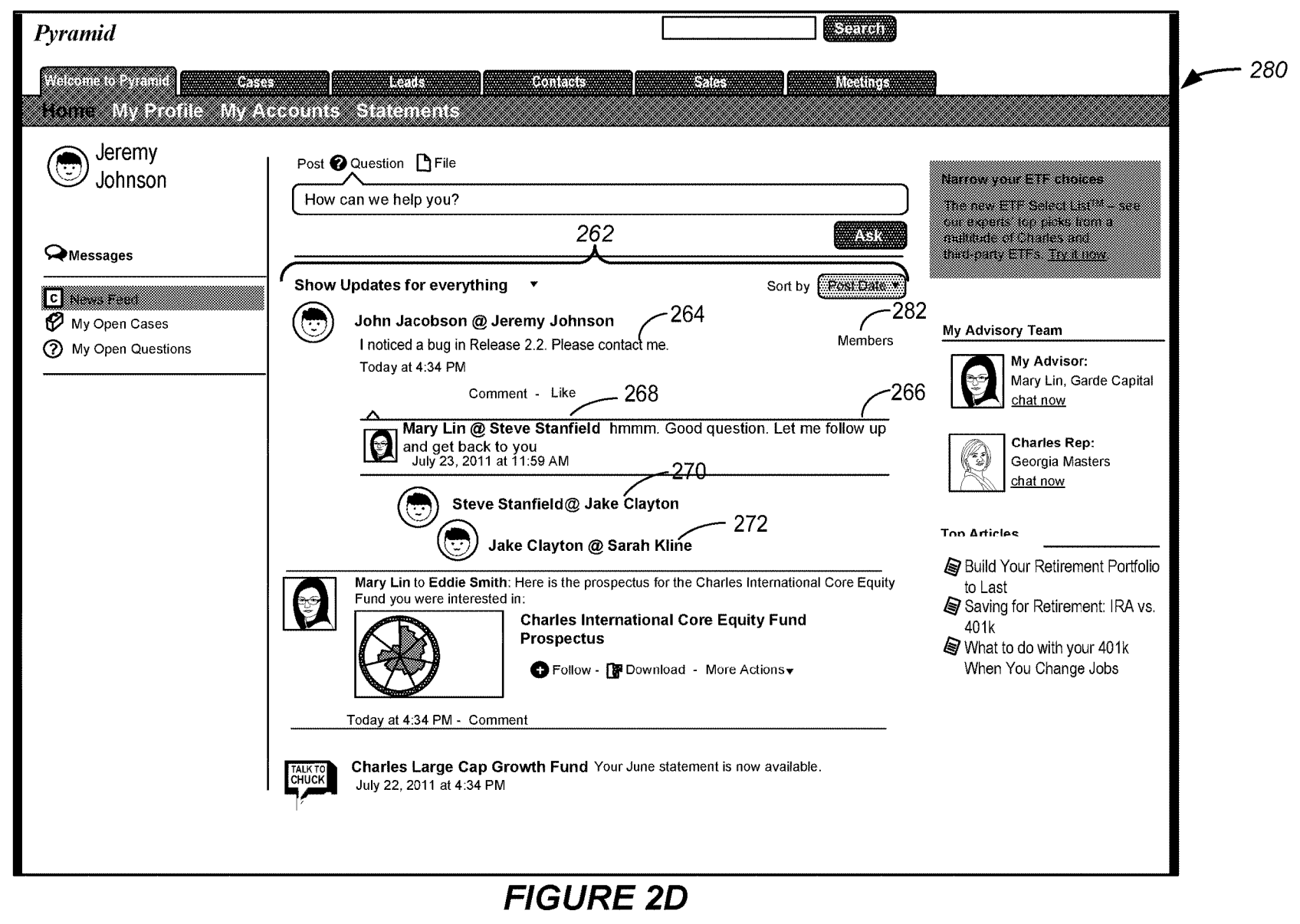
Figure 2E:
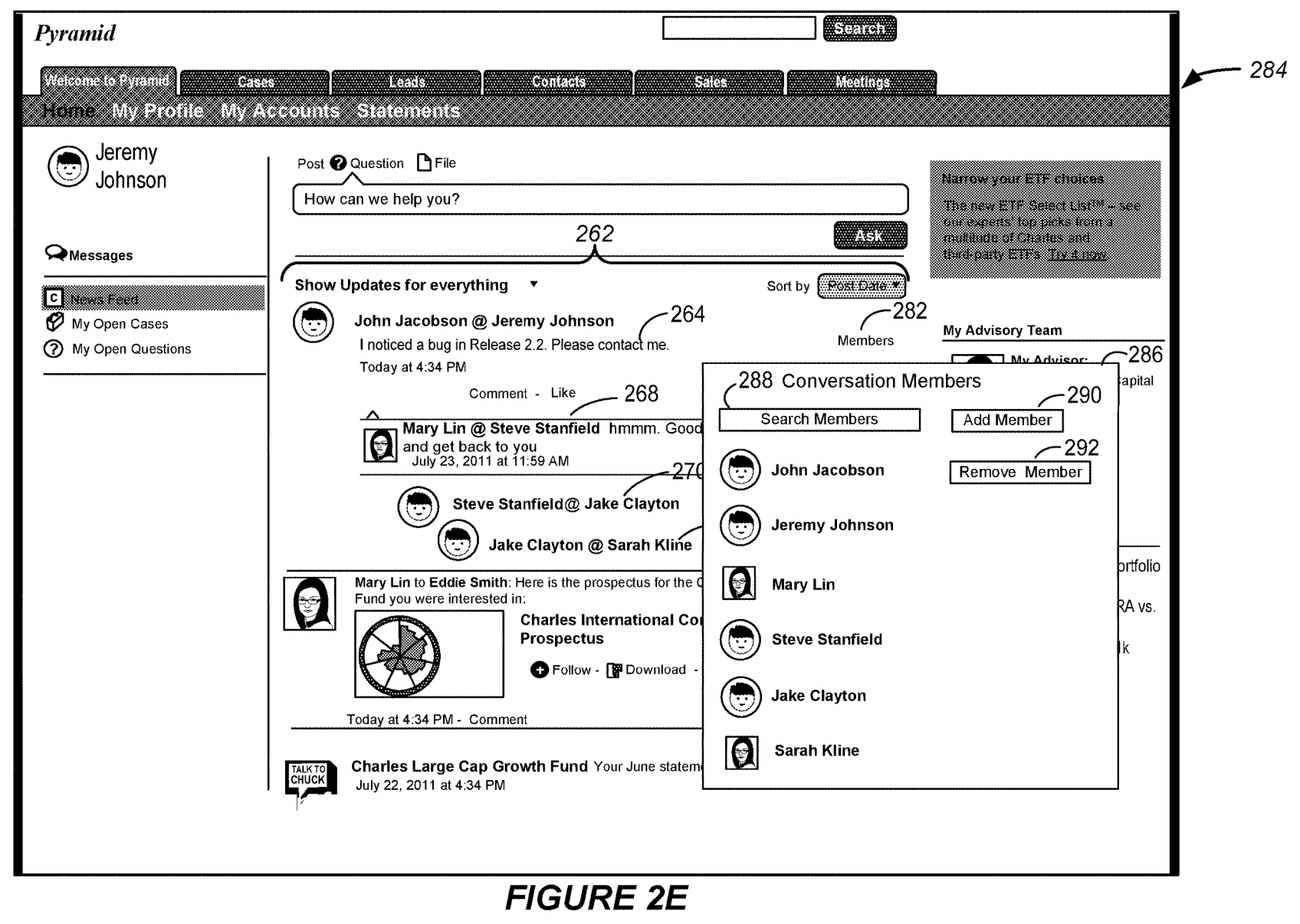

In accordance with various implementations, a conversation member may access a list of all conversation members to quickly ascertain the identities of the members of a conversation. An example of a user interface configured to provide conversation member management capabilities will be described in further detail below with reference to FIGS. 2D and 2E FIG. 2D shows a GUI 280 generated on a display device of a client machine in a social network environment, in accordance with one or more implementations. In this example, GUI 280 includes user interface element 282 configured to enable a user (e.g., conversation member) to access a conversation member management interface. User interface element 282 can include, for example, a button, a hypertext link, a menu, or a window. In this example, user interface element 282 is identified by "Members" text element that represents a hypertext link. To access the conversation member management interface, a user can interact with user interface element 282. For example, the user can click on user interface element 282 to access the conversation member management interface. An example conversation member management interface will be described in further detail below with reference to FIG. 2E.

FIG. 2E shows a GUI 284 generated on a display device of a client machine in a social network environment, in accordance with one or more implementations. Conversation member management interface 286 can be presented in response to a user interaction with user interface element 282. For example, the conversation member management interface 286 can be provided for display by the client machine in response to a user clicking on user interface element 282. Member management interface 286 can include a list of all conversation members of a conversation such as that described above with reference to FIG. 2C. More particularly, the list can be provided in response to user interaction with user interface element 282 or another user interface element, which can be provided within member management interface 286. Members of the conversation can be listed in the order in which they were added to the conversation, as shown in this example. In other words, members of the conversation can be listed in chronological order. Alternatively, members of the conversation can be listed in alphabetical order or another suitable configuration. In some implementations, the order in which members are presented within member management interface 286 is configurable by a user.

In accordance with various implementations, member management interface 286 indicates, for each member in the list, a role of the member in the conversation. For example, a member can be identified as an author, liker, commentator, mentioner, etc.

In some implementations, member management interface 286 includes search interface element 288 that enables a user to search for a particular individual or group. This may be useful where the member list is particularly lengthy. If the individual or group is a member of the conversation, the system may provide at least a portion of the list that includes the individual or group for display by the client device. The list may be provided for display within member management interface 286 or via a further user interface element. In some implementations, the system may transmit a notification message that indicates whether the individual or group is a member of the conversation. The notification message can be provided to a client device for display within or in conjunction with member management interface 286.

Member management interface 286 can include additional user interface elements that enable a user to modify the list of conversation members. In some implementations, member management interface 286 includes "Add Member" user interface element 290. A user can interact with user interface element 290 to add a new member to the conversation. For example, after a user searches for an individual, Sandy Larson, the system can provide, for display by the client device, a notification that Sandy Larson is not a member of the conversation. The user can add Sandy Larson by clicking on user interface element 290 and submitting the name of the individual, Sandy Larson, being added to the conversation.

In some implementations, member management interface 286 includes "Remove Member" user interface element 292. A user can interact with user interface element 292 to remove a member from the conversation. The capability to remove a member from the conversation may be provided to only a subset of the members of the conversation. For example, user interface element 292 may be provided to and/or enabled for the member being removed from the conversation. In other words, a user who wishes to no longer be a part of the conversation can remove him or herself from the conversation by interacting with user interface element 292. As another example, user interface element 292 may be provided to and/or enabled for a user in a managerial or other supervisory role (e.g., president, vice president, director). As shown in FIG. 2E, the user can click on user interface element 292 and submit the name of the member being removed from the conversation. In the event that the user does not have authority to remove a member from the conversation, the system may provide a notification, for display by the client device, indicating that the user does not have authority to remove a member or the particular member from the conversation.

In accordance with various implementations, the addition of a new member to the conversation or removal of a member from the conversation via interaction with user interface element(s) of the member management interface 286 results in the modification of the information that identifies the members of the conversation, as stored in database(s). In some implementations, responsive to interaction with user interface element(s) of the member management interface 286, the system modifies the information in the database(s) without notifying other users. In other words, the information in the database(s) can be updated without generating or providing corresponding feed items within the feeds of the conversation members or other users receiving feed items pertaining to the conversation. In this manner, membership of a conversation can be modified via direct interaction with the member management interface 286 without unnecessarily cluttering user feeds. In other implementations, the addition and/or removal of a member via interaction with user interface element(s) of the member management interface 286 can trigger the generation of corresponding feed items that can be rendered within feeds of users including the members of the conversation.

In this example, user interface elements 290 and 292 are buttons. However, a user interface element may be presented in another manner or format to enable a user to interact with the system. For example, a user interface element may include a hypertext link, tab, check box, or bar.

In some implementations, membership of a conversation may be modified via direct user interaction with the list. For example, a user can click on a member within the list to remove the member from the conversation. Information identifying the conversation members can be updated within the database(s) with or without notifying users of the change in membership, as described above.

Figure 2F:
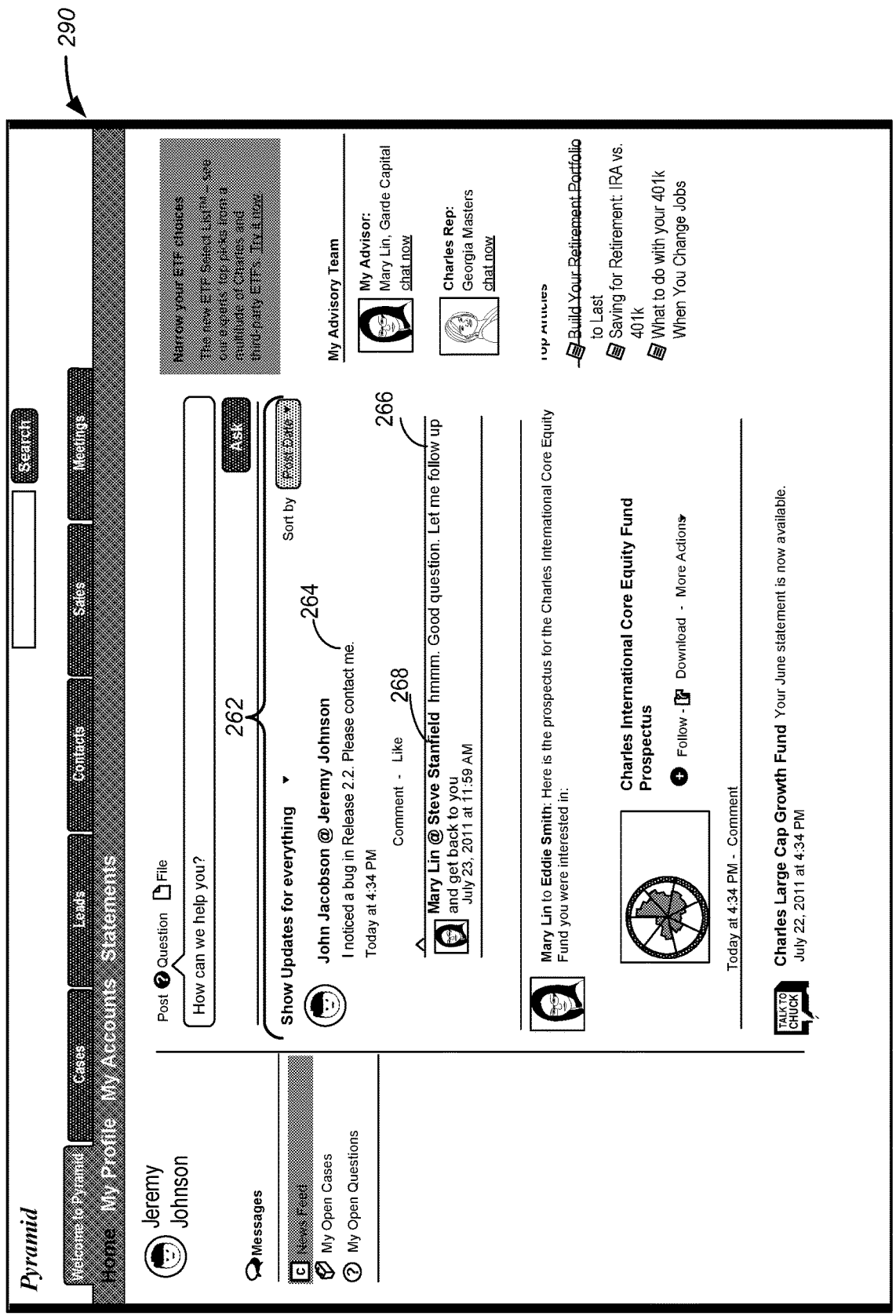
FIG. 2F shows a GUI 290 generated on a display device of a client machine in a social network environment, in accordance with one or more implementations.

FIG. 2F shows a GUI 290 generated on a display device of a client machine in a social network environment, in accordance with one or more implementations. As described above, new members can be added to a conversation without submitting associated comments. Referring back to the example shown in FIG. 2C, two members, Jake Clayton and Sarah Kline, were added as members of the conversation. Specifically, the two members were added via two separate mentions. Since the mentions do not substantively add to the conversation, the presentation of the mentions within user feeds merely serve to notify other users of the addition of the new members to the conversation. However, as additional members are added to the conversation, the feeds become more lengthy and confusing to users that are members of the conversation or other individuals that receive feed items pertaining to the conversation in their feeds.

In some implementations, to simplify user feeds, user-submitted mentions that add new members without associated comments can be eliminated from the user feeds. As shown in FIG. 2F, mentions 270 and 272 shown in FIG. 2C are eliminated from the feed 262. The elimination of mentions that are submitted without associated comments can be performed for all feeds or according to a particular configuration. For example, a user can submit a configuration in association with their feed without impacting the feeds of other users. As another example, a particular feed configuration may be established in association with a specific group or community of users. In accordance with various implementations, in the event that a user mentions a new member without submitting an associated comment, the mentioning of the new member is not shown in the feeds of other users. Instead, the user mentioning the new member can be notified, via the GUI 290, that the mentioning of the new member will not be included in the feeds of other users. In this manner, user feeds can receive feed items pertaining to a conversation that include substantive information without receiving unnecessary feed items that solely mention a new member being added to the conversation.

Figure 3:
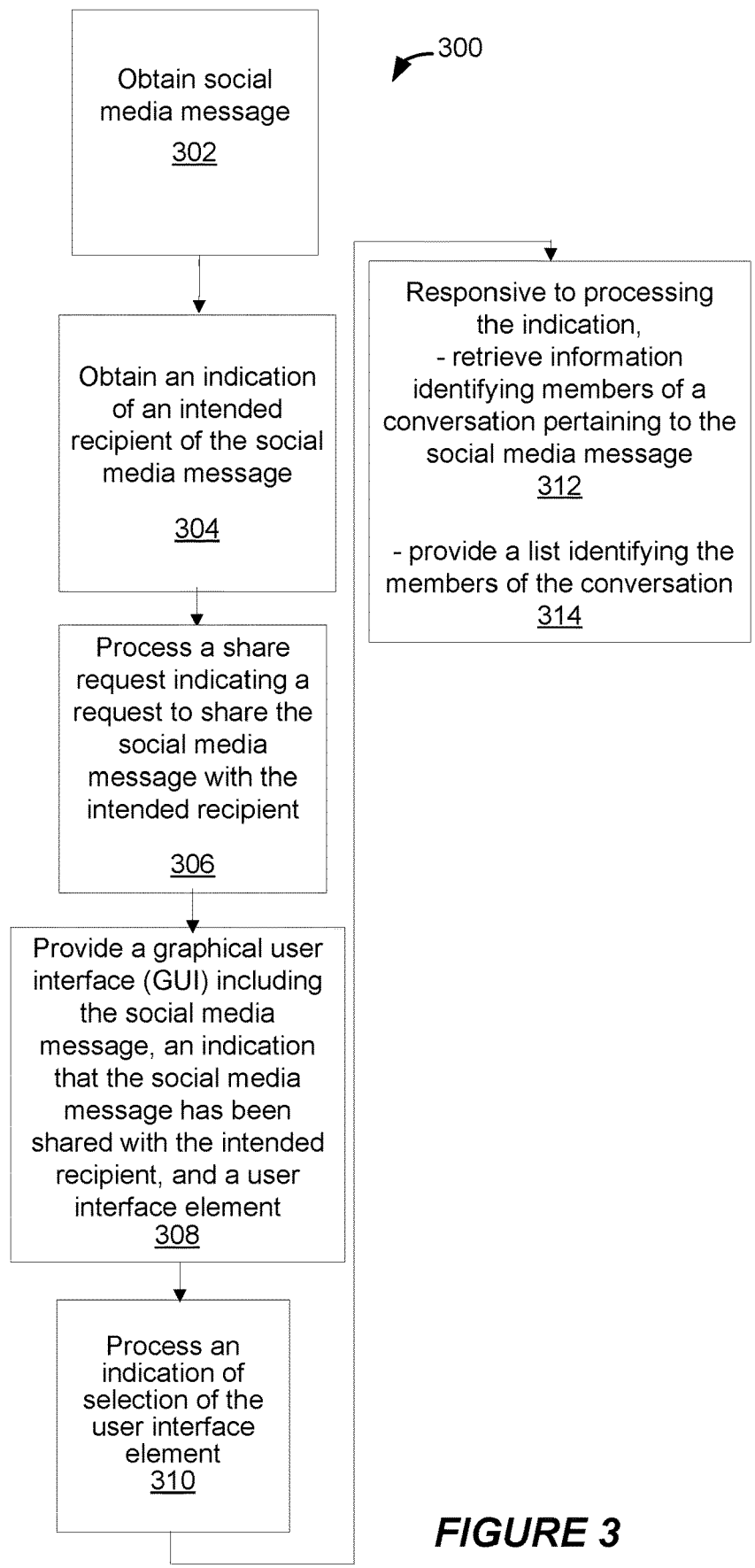
FIG. 3 shows an example of a method 300 for providing a conversation membership interface, in accordance with some implementations.

FIG. 3 shows an example of a method 300 for providing a conversation membership interface, in accordance with some implementations. A user may type a social media message and indicate an intended recipient of the social media message. The user may then submit a share request that indicates a request to share the social media message with the intended recipient. For example, the user may click on a Post or Share user interface element to share the social media message with the intended recipient. The user that submitted the social media message may also be referred to as an author of the social media message.

The social media message and an indication of the intended recipient of the social media message may be obtained by a database system via a social networking system as shown at 302 and 304, respectively. The share request indicating a request to share the social media message with the intended recipient may be processed at 306.

The system may provide a GUI for display at a client device at 308, where the GUI includes the social media message and an indication that the social media message has been shared with the intended recipient. More particularly, the GUI may be provided for display at a client device of the user or another individual, who may be a member of the conversation. In addition, the GUI may indicate a time that the social media message was shared.

After the message has been shared, additional members may be added to the conversation. In some implementations, the addition of a new member without an associated comment (e.g., via mentioning) is not communicated within the feeds of other users. In other words, this mentioning of an additional member may be effectively filtered (e.g., removed) from the feeds of other users.

For example, an indication of an identity of an additional member being added to the conversation pertaining to the social media message may be obtained via the social networking system. This indication may be submitted by a first member of the conversation. Where the indication (e.g., mention) is not submitted in conjunction with a comment on the social media message, the feed of a second member may be filtered such that the feed does not include an indication that the additional member has been added as one of the members of the conversation. In these instances, the first member may be notified that feeds of other members of the conversation will not include an indication that the additional member has been added to the conversation.

In accordance with various implementations, the GUI may further include a user interface element that enables a user to access a list of members of a conversation pertaining to the social media message. For example, the user interface element can include text (e.g., "Members") corresponding to a hypertext link or button. The user interface element may be presented in close proximity to the message within the GUI. The user can select the user interface element to access the list of members of the conversation. For example, the user may click on the user interface element.

The system may process an indication of selection of the user interface element at 310. Responsive to processing the indication of the selection of the user interface element, the database system may retrieve, from a database of the system, information identifying the members of the conversation pertaining to the social media message at 312 and provide a list identifying the members of the conversation for display at the client device at 314.

Each of the members of the conversation can correspond to a single individual or group of individuals. The members of the conversation can include, for example, an author of the social media message, the intended recipient of the social media message, individuals or groups who have been mentioned by one of the members in association with the social media message, individuals who have mentioned one of the members of the conversation, individuals who have commented on the social media message or a previous comment on the social media message, individuals who have liked the social media message, and/or individuals or groups who have been copied by one of the members in association with the social media message. The list is modifiable via user interaction with the list or one or more associated user interface elements, as will be described in further detail below with reference to FIG. 4.

Figure 4:
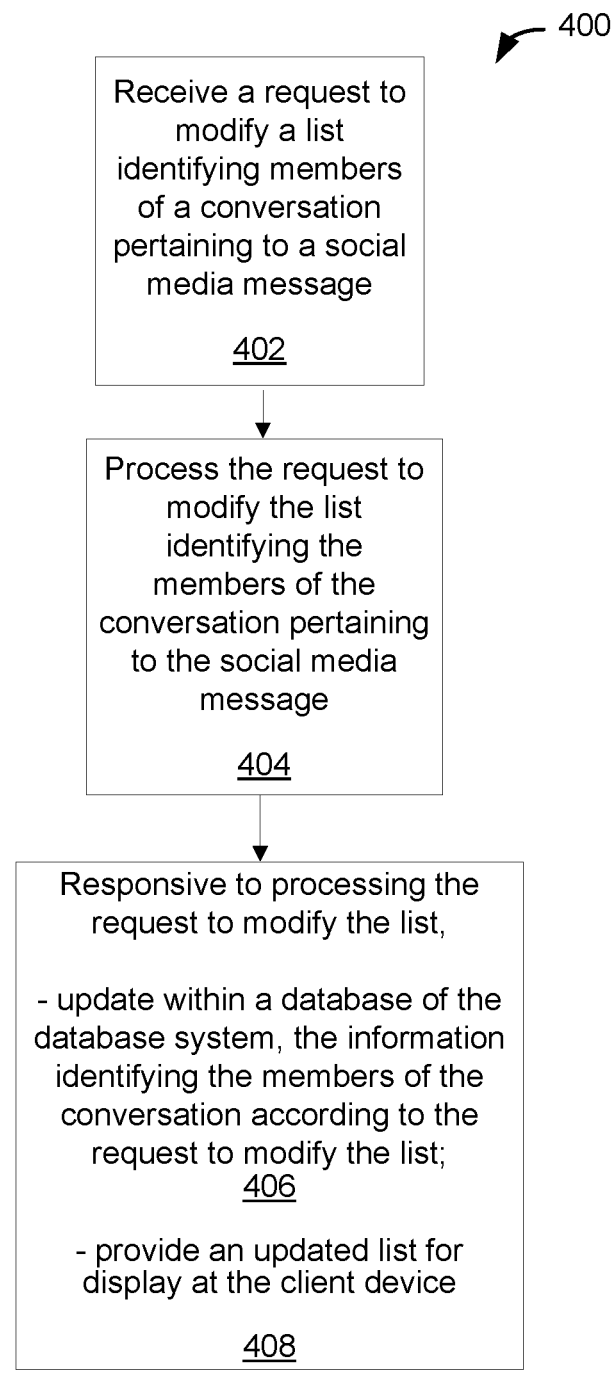
FIG. 4 shows an example of a method for modifying the membership of a conversation, in accordance with some implementations.

FIG. 4 shows an example of a method for modifying the membership of a conversation, in accordance with some implementations. A user may interact with a list identifying the members of a conversation pertaining to a social media message, either directly or via an associated user interface element. For example, the user may click on the list to add or remove a member. In some implementations, the user may select an "Add Member" user interface element to add a new member to the conversation. Alternatively, the user may select a "Remove Member" user interface element to remove a member from the conversation. Responsive to the user selection, a corresponding request to modify the list may be received by the system as shown at 402.

The system processes the request to modify the list at 404. In accordance with various implementations, the system identifies the user profile of the user and determines from the user profile whether the user has authority to modify the list. In some implementations, the system determines whether the user has the authority to modify the list in the manner requested. The user may have the authority to add a member to the conversation, but may have limited authority to remove a member from the conversation. For example, the user may have the authority to remove themselves from the conversation, but may have limited or no authority to remove other members from the conversation. In some instances, the user may have the authority to remove a member that the user originally added to the conversation. This may be desirable, for example, where the user has erroneously added a member to the conversation.

Responsive to processing the request to modify the list, the system may update, within a database of the database system, the information identifying the members of the conversation according to the request to modify the list at 406. For example, in response to a request to add an additional member to the conversation, the system may update the information such that the information identifies the additional member. As another example, in response to a request to remove a member from the conversation, the system may update the information such that one of the members is removed from the list. In addition, an updated list of conversation members that reflects the requested modification may be provided for display at the client device at 408.

Some but not all of the techniques described or referenced herein are implemented using or in conjunction with a social networking system. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. In some but not all implementations, these various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in a database system. In some but not all implementations, the disclosed methods, apparatus, systems, and computer program products may be configured or designed for use in a multi-tenant database environment. In accordance with various implementations, each tenant may implement a corresponding file deletion policy. A file deletion policy may be implemented by a single tenant or multiple tenants.

In some implementations, a social networking system may allow a user to follow data objects in the form of CRM records such as cases, accounts, or opportunities, in addition to following individual users and groups of users. The "following" of a record stored in a database, as described in greater detail below, allows a user to track the progress of that record when the user is subscribed to the record.

Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can be otherwise generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail below. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 5A:
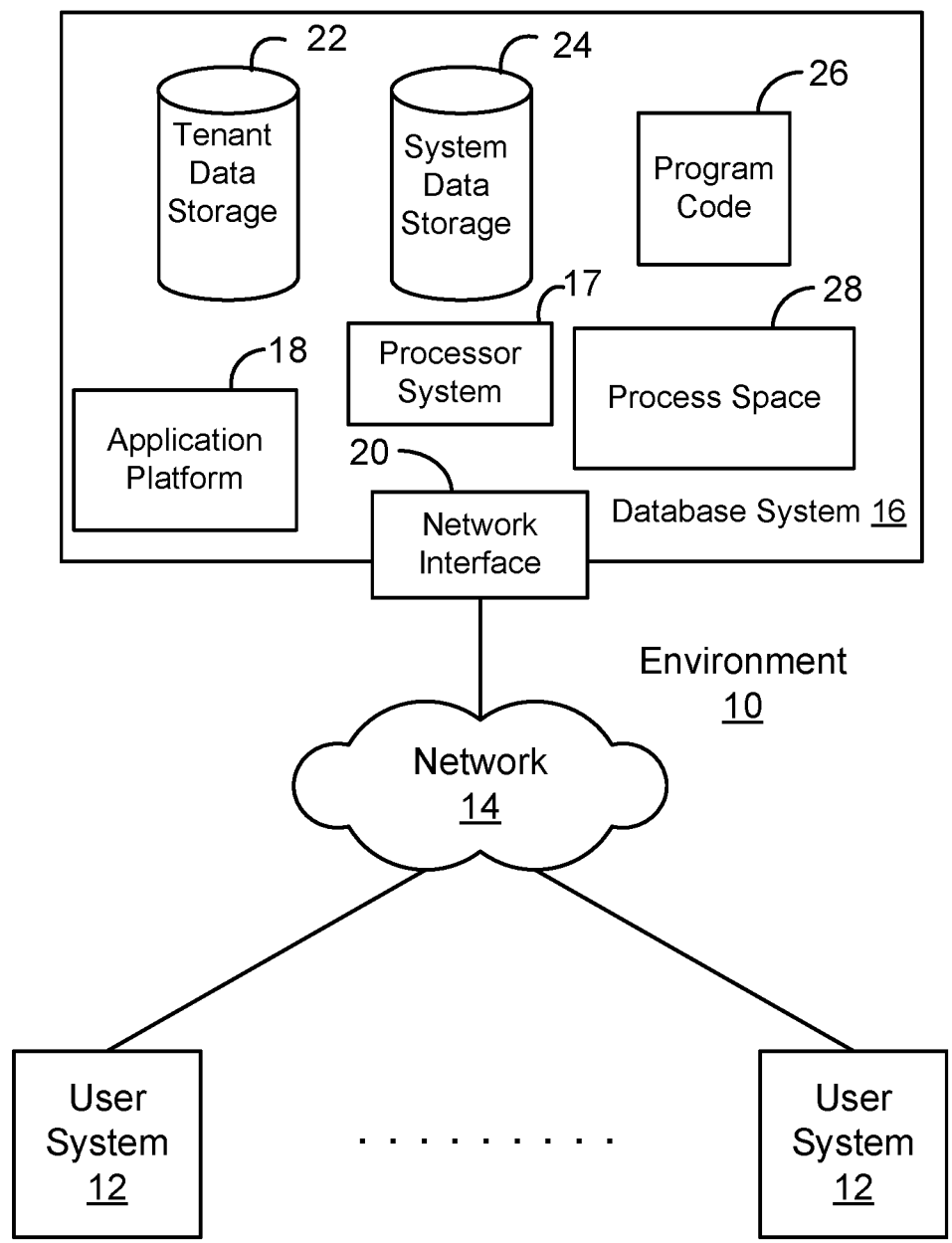
FIG. 5A shows a block diagram of an example of an environment 10 in which an on-demand database service can be used in accordance with some implementations.

FIG. 5A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 5A (and in more detail in FIG. 5B) user systems 12 might interact via a network 14 with an on-demand database service, which is implemented in the example of FIG. 5A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 5A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 5B:
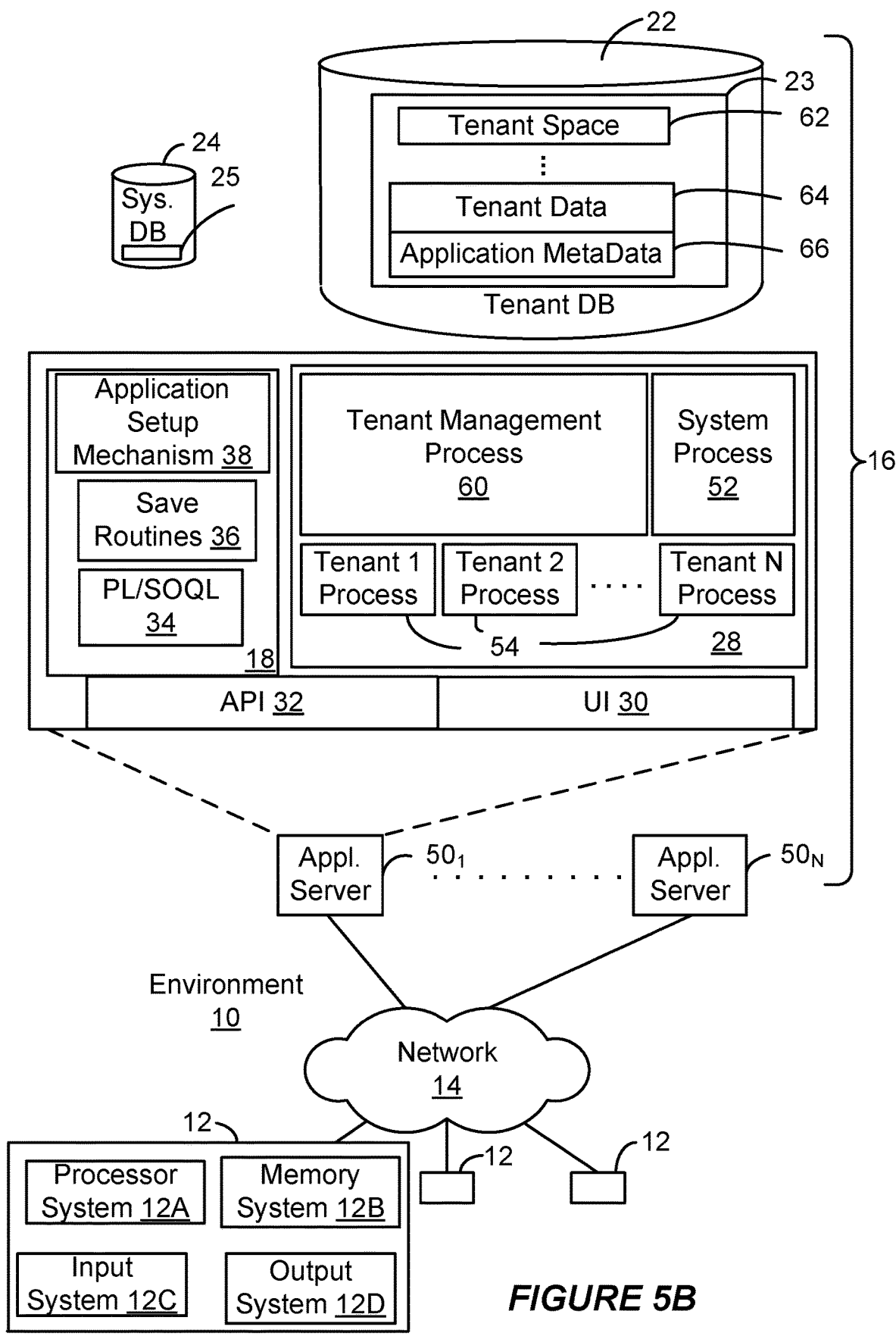
FIG. 5B shows a block diagram of an example of some implementations of elements of FIG. 5A and various possible interconnections between these elements.

One arrangement for elements of system 16 is shown in FIGS. 5A and 5B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 5A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 5B shows a block diagram of an example of some implementations of elements of FIG. 5A and various possible interconnections between these elements. That is, FIG. 5B also illustrates environment 10. However, in FIG. 5B elements of system 16 and various interconnections in some implementations are further illustrated. FIG. 5B shows that user system 12 may include processor system 12A, memory system 12B, input system 12C, and output system 12D. FIG. 5B shows network 14 and system 16. FIG. 5B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 5A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 5B, system 16 may include a network interface 20 (of FIG. 5A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 6A:
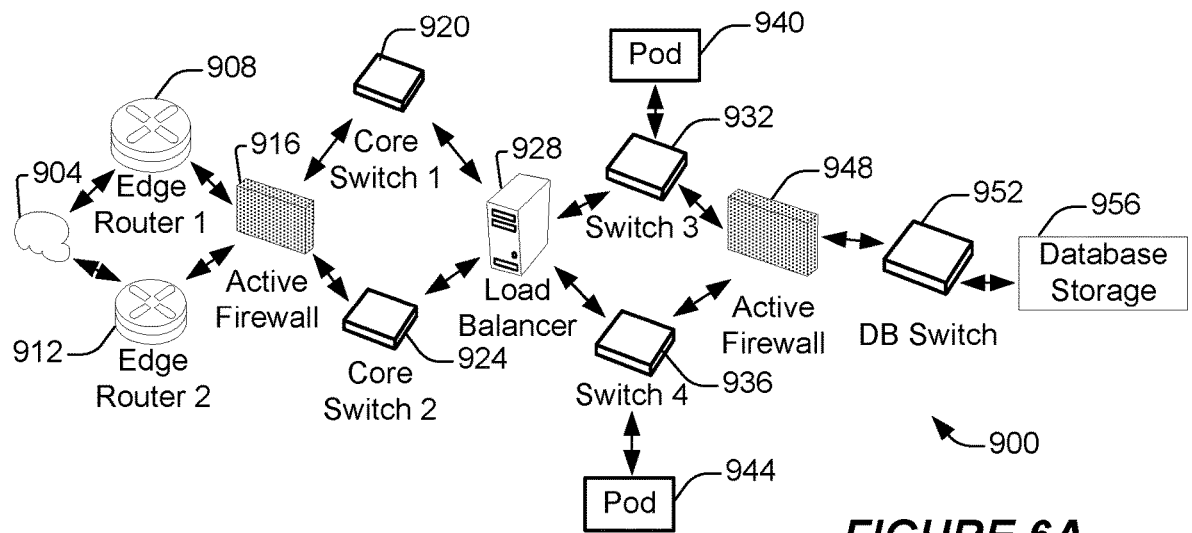
FIG. 6A shows a system diagram of an example of architectural components of an on-demand database service environment 900, in accordance with some implementations.

FIG. 6A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 6B:
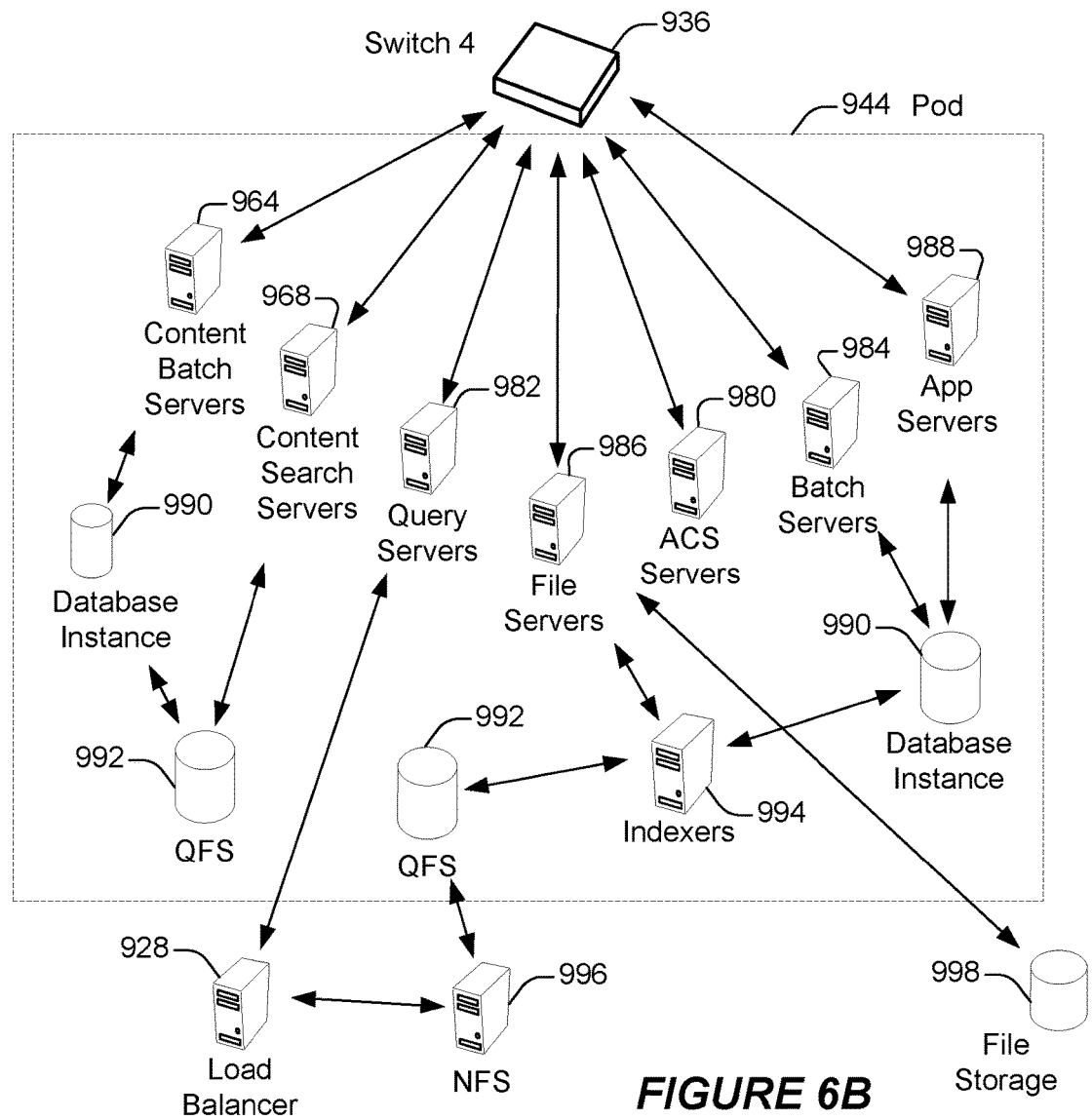
FIG. 6B shows a system diagram further illustrating an example of architectural components of an on-demand database service environment, in accordance with some implementations.

As shown in FIGS. 6A and 6B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 6A and 6B, some implementations of an on-demand database service environment may include anywhere from one to many devices of each type. Also, the on-demand database service environment need not include each device shown in FIGS. 6A and 6B, or may include additional devices not shown in FIGS. 6A and 6B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 6B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 6A and 6B.

FIG. 6B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 5A and 5B include a hardware and/or software framework configurable to execute procedures using programs, routines, scripts, etc. Thus, in some implementations, one or more of application servers $50_1$-$50_N$ of FIG. 5B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 6B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 5A, 5B, 6A and 6B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 5A and 5B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 5A, 5B, 6A and 6B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database system implemented using a server system including one or more servers, the database system configurable to cause:
obtaining, via an online social networking system, a social media message;
obtaining, via the online social networking system, an indication of an intended recipient of the social media message;
processing a share request received via the online social networking system, the share request indicating a request to share the social media message with the intended recipient, the social media message being one of one or more messages of a conversation pertaining to the social media message;
providing, via the online social networking system a graphical user interface (GUI) for display at a client device of a first member of the conversation pertaining to the social media message, the GUI providing a user interface element and an information feed, the information feed including the social media message and an indication that the social media message has been shared with the intended recipient;
responsive to processing an indication of a selection of the user interface element of the GUI,
retrieving, from a database of the database system, information identifying members of the conversation pertaining to the social media message; and
providing, via the online social networking system, a list for display at the client device, the list identifying the members of the conversation pertaining to the social media message, the members including an author of the social media message, the intended recipient of the social media message, individuals who have been mentioned by one of the members in association with the social media message, individuals who have mentioned one of the members of the conversation, individuals who have commented on the social media message or a previous comment on the social media message, and individuals who have liked the social media message, the list being modifiable via interaction with the list or one or more associated user interface elements;
obtaining, via the online social networking system, an indication of an identity of one or more additional members being added to the conversation by the first member of the conversation, the indication of the identity of the additional members including one or more identifiers of the additional members, wherein the indication of the identity of the additional members being added to the conversation is not submitted in conjunction with a post pertaining to the conversation;
updating the information identifying the members of the conversation to include the additional members, the members of the conversation being followers of one another;
generating a filtered information feed by filtering the information feed, the filtered information feed not including an indication that the additional members have been added as one or more of the members of the conversation; and
providing the filtered information feed via the online social networking system for display at a client device of a second one of the members of the conversation.

2. The system of claim 1, the database system being further configurable to cause:
processing a user request to modify the list identifying the members of the conversation pertaining to the social media message, the user request including an indication of selection of a second interface element; and
responsive to processing the user request to modify the list identifying the members of the conversation pertaining to the social media message, updating, within the database of the database system, the information identifying the members of the conversation pertaining to the social media message according to a result of processing the request, wherein updating the information is performed without updating the filtered information feed.

3. The system of claim 2, the database system being further configurable to cause:
determining whether the user has authority to modify the list identifying the members of the conversation according to the user request;
wherein updating the information is performed according to a result of determining whether the user has authority to modify the list identifying the members of the conversation according to the user request.

4. The system of claim 1, the database system being further configurable to cause:
processing a user request to add at least an additional member to the list identifying the members of the conversation pertaining to the social media message, the user request including an indication of selection of a second interface element; and responsive to processing the user request to add the additional member to the list, updating, within the database of the database system, the information identifying the members of the conversation pertaining to the social media message such that the information identifies the additional member, wherein updating is performed without updating the filtered information feed; and providing an updated list for display at the client device, the updated list identifying the members of the conversation pertaining to the social media message, the members including the additional member.

5. The system of claim 1, the database system being further configurable to cause:

processing a request to remove a particular one of the members from the conversation pertaining to the social media message; and responsive to processing the request to remove the particular one of the members from the conversation pertaining to the social media message, updating, within the database of the database system, the information identifying the members of the conversation pertaining to the social media message such that the information does not identify the particular one of the members, wherein updating the information is performed without updating the filtered information feed; and providing an updated list for display at the client device, the updated list identifying the members of the conversation pertaining to the social media message, the updated list not identifying the particular one of the members.

6. The system of claim 1, the database system being further configurable to cause:

notifying the first member of the conversation pertaining to the social media message that feeds of other members of the conversation do not include an indication that the additional members have been added to the conversation by the first member of the conversation pertaining to the social media message.

7. A non-transitory computer-readable medium comprising computer-readable program code capable of being executed by one or more processors, the program code comprising computer-readable instructions configurable to cause:

obtaining, via an online social networking system, a social media message;

obtaining, via the online social networking system, an indication of an intended recipient of the social media message;

processing a share request received via the online social networking system, the share request indicating a request to share the social media message with the intended recipient, the social media message being one of one or more messages of a conversation pertaining to the social media message;

providing, via the online social networking system a graphical user interface (GUI) for display at a client device of a first member of the conversation pertaining to the social media message, the GUI providing a user interface element and an information feed, the information feed including the social media message and an indication that the social media message has been shared with the intended recipient;

responsive to processing an indication of a selection of the user interface element of the GUI, retrieving, from a database of the database system, information identifying members of the conversation pertaining to the social media message; and providing, via the online social networking system, a list for display at the client device, the list identifying the members of the conversation pertaining to the social media message, the members including an author of the social media message, the intended recipient of the social media message, individuals who have been mentioned by one of the members in association with the social media message, individuals who have mentioned one of the members of the conversation, individuals who have commented on the social media message or a previous comment on the social media message, and individuals who have liked the social media message, the list being modifiable via interaction with the list or one or more associated user interface elements;

obtaining, via the online social networking system, an indication of an identity of one or more additional members being added to the conversation by the first member of the conversation, the indication of the identity of the additional members including one or more identifiers of the additional members, wherein the indication of the identity of the additional members being added to the conversation is not submitted in conjunction with a post pertaining to the conversation;

updating the information identifying the members of the conversation to include the additional members, the members of the conversation being followers of one another;

generating a filtered information feed by filtering the information feed, the filtered information feed not including an indication that the additional members have been added as one or more of the members of the conversation; and providing the filtered information feed via the online social networking system for display at a client device of a second one of the members of the conversation.

8. The non-transitory computer-readable medium of claim 7, the program code comprising computer-readable instructions further configured to cause:

processing a user request to modify the list identifying the members of the conversation pertaining to the social media message, the user request including an indication of selection of a second interface element; and responsive to processing the user request to modify the list identifying the members of the conversation pertaining to the social media message, updating, within the database of the database system, the information identifying the members of the conversation pertaining to the social media message according to a result of processing the request, wherein updating the information is performed without updating the filtered information feed.

9. The non-transitory computer-readable medium of claim 8, the program code comprising computer-readable instructions further configured to cause:

determining whether the user has authority to modify the list identifying the members of the conversation according to the user request;

wherein updating the information is performed according to a result of determining whether the user has authority to modify the list identifying the members of the conversation according to the user request.

10. The non-transitory computer-readable medium of claim 7, the program code comprising computer-readable instructions further configured to cause:
- processing a user request to add an additional member to the list identifying the members of the conversation pertaining to the social media message, the user request including an indication of selection of a second interface element; and
- responsive to processing the user request to add the additional member to the list,
- updating, within the database of the database system, the information identifying the members of the conversation pertaining to the social media message such that the information identifies the additional member, wherein updating the information is performed without updating the filtered information feed; and
- providing an updated list for display at the client device, the updated list identifying the members of the conversation pertaining to the social media message, the members including the additional member.

11. The non-transitory computer-readable medium of claim 7, the program code comprising computer-readable instructions further configured to cause:
- processing a request to remove a particular one of the members from the conversation pertaining to the social media message; and
- responsive to processing the request to remove the particular one of the members from the conversation pertaining to the social media message,
- updating, within the database of the database system, the information identifying the members of the conversation pertaining to the social media message such that the information does not identify the particular one of the members; and
- providing an updated list for display at the client device, the updated list identifying the members of the conversation pertaining to the social media message, the updated list not identifying the particular one of the members.

12. A method, comprising:
- obtaining, via an online social networking system, a social media message;
- obtaining, via the online social networking system, an indication of an intended recipient of the social media message;
- processing a share request received via the online social networking system, the share request indicating a request to share the social media message with the intended recipient, the social media message being one of one or more messages of a conversation pertaining to the social media message;
- providing, via the online social networking system a graphical user interface (GUI) for display at a client device of a first member of the conversation pertaining to the social media message, the GUI providing a user interface element and an information feed, the information feed including the social media message and an indication that the social media message has been shared with the intended recipient;
- responsive to processing an indication of a selection of the user interface element of the GUI,
  - retrieving, from a database of the database system, information identifying members of the conversation pertaining to the social media message; and
  - providing, via the online social networking system, a list for display at the client device, the list identifying the members of the conversation pertaining to the social media message, the members including an author of the social media message, the intended recipient of the social media message, individuals who have been mentioned by one of the members in association with the social media message, individuals who have mentioned one of the members of the conversation, individuals who have commented on the social media message or a previous comment on the social media message, and individuals who have liked the social media message, the list being modifiable via interaction with the list or one or more associated user interface elements;
- obtaining, via the online social networking system, an indication of an identity of one or more additional members being added to the conversation by the first member of the conversation, the indication of the identity of the additional members including one or more identifiers of the additional members, wherein the indication of the identity of the additional members being added to the conversation is not submitted in conjunction with a post pertaining to the conversation;
- updating the information identifying the members of the conversation to include the additional members, the members of the conversation being followers of one another;
- generating a filtered information feed by filtering the information feed, the filtered information feed not including an indication that the additional members have been added as one or more of the members of the conversation; and
- providing the filtered information feed via the online social networking system for display at a client device of a second one of the members of the conversation.

13. The method of claim 12, further comprising:
- processing a user request to modify the list identifying the members of the conversation pertaining to the social media message, the user request including an indication of selection of a second interface element; and
- responsive to processing the user request to modify the list identifying the members of the conversation pertaining to the social media message, updating, within the database of the database system, the information identifying the members of the conversation pertaining to the social media message according to a result of processing the request, wherein updating the information is performed without updating the filtered information feed.

14. The method of claim 13, the method further comprising:
- determining whether the user has authority to modify the list identifying the members of the conversation according to the user request;
- wherein updating the information is performed according to a result of determining whether the user has authority to modify the list identifying the members of the conversation according to the user request.

15. The method of claim 12, the method further comprising:
- processing a user request to add at least an additional member to the list identifying the members of the conversation pertaining to the social media message, the user request including an indication of selection of a second interface element; and
- responsive to processing the user request to add the additional member to the list,
- updating, within the database of the database system, the information identifying the members of the conversation pertaining to the social media message such that the information identifies the additional member, wherein updating the information is performed without updating the filtered information feed; and providing an updated list for display at the client device, the updated list identifying the members of the conversation pertaining to the social media message, the members including the additional member.

16. The method of claim 12, the method further comprising:

processing a request to remove a particular one of the members from the conversation pertaining to the social media message; and responsive to processing the request to remove the particular one of the members from the conversation pertaining to the social media message, updating, within the database of the database system, the information identifying the members of the conversation pertaining to the social media message such that the information does not identify the particular one of the members; and providing an updated list for display at the client device, the updated list identifying the members of the conversation pertaining to the social media message, the updated list not identifying the particular one of the members.

17. The method of claim 12, the method further comprising:

notifying the first member of the conversation pertaining to the social media message that feeds of other members of the conversation do not include an indication that the additional members have been added to the conversation by the first member of the conversation pertaining to the social media message.

18. The method of claim 12, wherein generating a filtered information feed is performed according to a configuration indicating that filtering is to be performed when an indication of an identity of at least one additional member being added to a conversation is not submitted in conjunction with a post pertaining to the conversation.

19. The system of claim 1, the indication of the identity of the additional members consisting of the identifiers of the additional members and one or more characters signifying addition of the additional members to the conversation, the one or more characters preceding the identifiers of the additional members.

20. The system of claim 1, the indication of the identity of the additional members consisting of the identifiers of the additional members.

* * * * *